No. 702,325. Patented June 10, 1902.
F. L. NATHAN, J. M. THOMSON & W. RINTOUL.
APPARATUS FOR THE MANUFACTURE OF NITROGLYCERIN.
(Application filed Mar. 7, 1902.)
(No Model.)
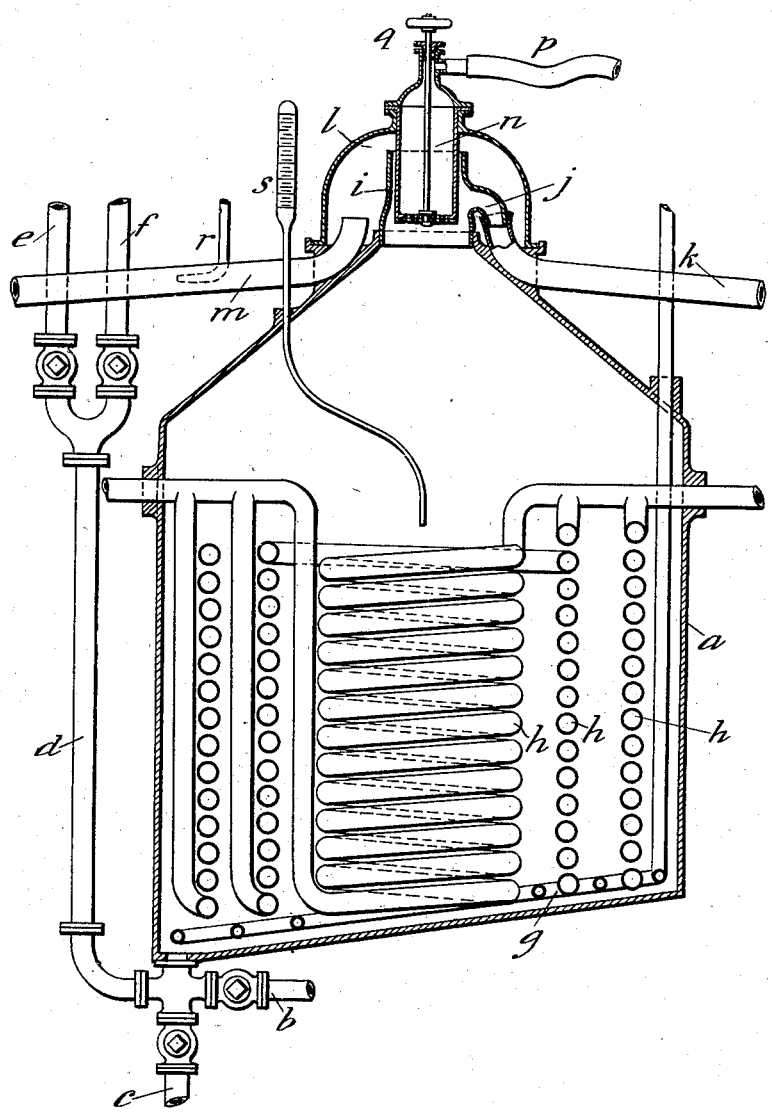

UNITED STATES PATENT OFFICE.

FREDERIC LEWIS NATHAN, JAMES MILN THOMSON, AND WILLIAM RINTOUL, OF WALTHAM ABBEY, ENGLAND.

APPARATUS FOR THE MANUFACTURE OF NITROGLYCERIN.

SPECIFICATION forming part of Letters Patent No. 702,325, dated June 10, 1902.

Application filed March 7, 1902. Serial No. 97,166. (No model.)

*To all whom it may concern:*

Be it known that we, FREDERIC LEWIS NATHAN, JAMES MILN THOMSON, and WILLIAM RINTOUL, citizens of England, residing at the Royal Gunpowder Factory, Waltham Abbey, in the county of Essex, England, have invented a certain new and useful Improved Apparatus for the Manufacture of Nitroglycerin, (for which we have applied for a patent in Great Britain dated August 8, 1901, No. 15,983,) of which the following is a specification.

This invention relates to apparatus for the manufacture of nitroglycerin, so arranged that the nitration of the glycerin, the separation of the nitroglycerin produced, as well as the operation usually known as "after separating," are carried out in one vessel. For this purpose we provide the usual nitrating vessel with an acid-inlet pipe at the bottom and a glass separation-cylinder with a lateral exit or overflow pipe at the top. This cylinder is covered by a glass hood or bell-jar during nitration to direct the escaping air and fumes into a fume-pipe, where the flow of the latter may be assisted by an air-injector. The lateral pipe in the separation-cylinder is in connection with a funnel leading to the "pre-wash" tank.

The accompanying drawing shows a vertical section of apparatus according to our invention.

$a$ is a nitrating vessel of usual construction, having at the bottom an acid-inlet pipe with three branches, one, $b$, leading to the denitrating plant, $c$, leading to the drowning-tank, and $d$, which extends upward and has two branches $e$, leading to the acid-tank, and $f$, to the waste-acid tank.

On the sloped bottom of the nitrating vessel $a$ lies a coil $g$ of perforated pipe for blowing air, and there are in the vessel several coils $h$ (three shown in the drawing) for circulation of cooling-water. At the top of the vessel there is a glass cylinder $i$, having a lateral outlet $j$, directed into the funnel-mouth of a pipe $k$, leading to the pre-wash tank. Over the cylinder $i$ is a glass globe $l$, into which opens a pipe $m$ for leading off fumes which may be promoted by a compressed-air jet from a pipe $r$, operating as an ejector. Into an opening of the glass dome $l$ is inserted a vessel $n$, which is connected by a flexible pipe $p$ to the glycerin-tank, and the bottom of vessel $n$ is perforated and covered with a disk perforated with holes registering with those through the bottom, this disk being connected by a stem with a knob $q$, by which it can be turned so as to throttle or cut off passage of glycerin through the bottom. $s$ is a thermometer for indicating the temperature of the contents of the vessel.

In operating with this apparatus the nitrating-acid is introduced into the nitrating vessel by opening the cock of the pipe $e$. The glycerin is then run in by introducing vessel $n$ and opening the valve at its bottom, the contents of the vessel being agitated by air blown through the perforations of the pipe $g$. When the glycerin is all nitrated and the temperature has slightly fallen, the circulation of water through the coils $h$ and the air-stirring are stopped, the glycerin-supply vessel $n$ is removed. The nitroglycerin as it separates from the acids is raised by introducing by the pipe $f$ waste acid from a previous charge, this displacing the nitroglycerin upward and causing it to flow by the outlet $j$ and pipe $k$ to the pre-washing tank. When nearly all the nitroglycerin has been separated in this manner, the acids in the apparatus may be run off by the pipe $b$ to an after-separating vessel for further settling, thus leaving the apparatus free for another nitration, or the nitrating vessel itself may be used as an after-separating bottle, displacing the nitroglycerin with waste acid as it rises to the top or skimming off in the usual manner. When the separation of the nitroglycerin is complete, the waste acid is run off and denitrated as usual, a portion of it being reserved for the displacement of the nitroglycerin in a subsequent operation.

Having thus described the nature of this invention and the best means we know of carrying the same into practical effect, we claim—

Apparatus for the manufacture of nitroglycerin, consisting of a vessel provided with an air-blast pipe, coils for circulation of cooling-water, pipes for supply of acid and of waste acid, a valved arrangement for supply of glycerin and pipes for discharge of the nitroglycerin produced and of the fumes, substantially as described.

In testimony whereof we have hereunto set our hands in presence of two subscribing witnesses.

FREDERIC LEWIS NATHAN.
JAMES MILN THOMSON.
WILLIAM RINTOUL.

Witnesses to the signature of Frederic Lewis Nathan:
ROBERT J. BIRD,
R. ENDERLY.

Witnesses to the signatures of James Miln Thomson and William Rintoul:
GEO. M. FRANKLIN,
W. M. HARRIS.